US011071285B2

(12) United States Patent
Grajcar

(10) Patent No.: US 11,071,285 B2
(45) Date of Patent: Jul. 27, 2021

(54) METHODS FOR CONTROLLING SEX OF OVIPAROUS EMBRYOS USING LIGHT AND TEMPERATURE

(71) Applicant: SIGNIFY NORTH AMERICA CORPORATION, Somerset, NJ (US)

(72) Inventor: Zdenko Grajcar, Orono, MN (US)

(73) Assignee: SIGNIFY NORTH AMERICA CORPORATION, Somerset, NJ (US)

( * ) Notice: Subject to any disclaimer, the term of this patent is extended or adjusted under 35 U.S.C. 154(b) by 346 days.

(21) Appl. No.: 15/993,244

(22) Filed: May 30, 2018

(65) Prior Publication Data

US 2018/0271067 A1    Sep. 27, 2018

Related U.S. Application Data

(63) Continuation-in-part of application No. 15/052,030, filed on Feb. 24, 2016, which is a continuation-in-part of application No. 14/992,935, filed on Jan. 11, 2016, which is a continuation-in-part of application No. 14/877,881, filed on Oct. 7, 2015, now abandoned, which is a continuation-in-part of application No. 14/696,267, filed on Apr. 24, 2015, and a continuation-in-part of application No. 14/103,798, filed on Dec. 11, 2013.

(60) Provisional application No. 62/512,966, filed on May 31, 2017, provisional application No. 61/984,108, filed on Apr. 25, 2014, provisional application No. 61/845,466, filed on Jul. 12, 2013, provisional application No. 61/813,905, filed on Apr. 19, 2013, provisional application No. 61/802,826, filed on Mar. 18, 2013, provisional application No. 61/759,536, filed on Feb. 1, 2013, provisional application No. 61/746,475, filed on Dec. 27, 2012, provisional application No. 61/735,786, filed on Dec. 11, 2012.

(51) Int. Cl.
*A01K 45/00*    (2006.01)
*A01K 41/02*    (2006.01)

(52) U.S. Cl.
CPC .......... *A01K 45/007* (2013.01); *A01K 41/023* (2013.01)

(58) Field of Classification Search
CPC ...... A01K 45/007; A01K 61/00; A01K 67/02; A01K 67/005
USPC ................................. 119/6.6, 6.8, 306, 50.7
See application file for complete search history.

(56) References Cited

U.S. PATENT DOCUMENTS 3,038,443 A * 6/1962 Miller .................... A01K 41/00
                                                      119/300
4,378,758 A * 4/1983 Coleman ................ A01K 41/00
                                                      119/300

(Continued)

*Primary Examiner* — Ebony E Evans

(57) ABSTRACT

The sex of embryos in eggs is influenced or controlled through the application of light having selected wavelengths and heat in order to promote the development of embryos of a selected sex. An incubating device is provided having an interior cavity that can be sealed from an outside, and having a plurality of lighting elements disposed in the interior cavity. Eggs are disposed on trays, and pre-determined environmental conditions are applied to the interior cavity to promote hatching of the eggs. Concurrently with the application of the environmental conditions, the eggs are irradiated according to pre-determined lighting conditions having wavelengths substantially concentrated in selected ranges In some embodiments, the temperature of the incubator is kept above or below the optimal incubation temperature.

8 Claims, 6 Drawing Sheets

(56) References Cited

U.S. PATENT DOCUMENTS

| | | | | |
|---|---|---|---|---|
| 4,625,728 A | * | 12/1986 | Schonberg | A01K 29/00 |
| | | | | 119/6.8 |
| 4,721,062 A | * | 1/1988 | Williams | A01K 45/00 |
| | | | | 119/437 |
| 5,575,237 A | * | 11/1996 | Ferguson | A01K 41/00 |
| | | | | 119/300 |
| 5,814,078 A | * | 9/1998 | Zhou | A61N 1/40 |
| | | | | 607/1 |
| 2003/0003437 A1 | * | 1/2003 | Rozenboim | A01K 45/007 |
| | | | | 435/4 |
| 2003/0172878 A1 | * | 9/2003 | El Halawani | A01K 45/00 |
| | | | | 119/300 |
| 2012/0084873 A1 | * | 4/2012 | Sinclair | A01K 67/0275 |
| | | | | 800/19 |
| 2020/0113157 A1 | * | 4/2020 | Haj' Nashat | A01K 41/06 |

* cited by examiner

METHODS FOR CONTROLLING SEX OF OVIPAROUS EMBRYOS USING LIGHT AND TEMPERATURE

CROSS-REFERENCE TO RELATED APPLICATIONS

This application is a continuation in part of U.S. patent application Ser. No. 14/103,789 entitled Method for Controlling Sex of Oviparous Embryos Using Light Sources fried Dec. 11, 2013 to Grajcar that claims priority from U.S. Provisional Patent Application No. 61/735,786, filed on Dec. 11, 2012; U.S. Provisional Patent Application No. 61/746,475, filed on Dec. 27, 2012; U.S. Provisional Patent Application No. 61/759,536 filed on Feb. 1, 2013, U.S. Provisional Patent Application No. 61/802,826 filed on Mar. 18, 2013; U.S. Provisional Patent Application No. 61/813, 905 filed on Apr. 19, 2013; and U.S. Provisional Patent Application No. 61/845,466 filed on Jul. 12, 2013; is a continuation in part of U.S. patent application Ser. No. 15/052,021 which claims priority of Ser. No. 14/103,789; is a continuation in part of U.S. patent application Ser. No. 15/052,030 which claims priority of Ser. No. 14/103,789; is a continuation in part of U.S. patent application Ser. No. 14/992,935 which claims priority to Ser. No. 14/103,789; is a continuation in part of U.S. patent application Ser. No. 14/696,267 which claims priority to provisional Patent Application No. 61/984,108 and to U.S. patent application Ser. No. 14/103,789; and is a continuation in part of U.S. patent application Ser. No. 14/877,881 which claims priority to U.S. patent application Ser. No. 14/103,789; and claims priority to U.S. Provisional Application No. 62/512,996 filed May 31, 2017 all to Grajcar, the disclosures of which are all incorporated herein in their entireties.

TECHNICAL FIELD

This document pertains generally, but not by way of limitation, to providing light and heat to incubating oviparous and avian species eggs.

BACKGROUND

While sex (or gender) in higher vertebrates is determined at fertilization, sex determining genes in chicken become active at a later stage during embryogenesis to induce the formation of testes or ovaries. This has led to the long-standing belief that much of the under lying genetic pathway is conserved through the later stage of embryogenesis. However, comparative studies on sex determination in the chicken embryo have revealed both conserved and divergent elements in the pathway. For example, the gonads of chicken embryos are morphologically indistinguishable between the sexes, and thus "indifferent" or "bipotential," at days 3.5-4.5.

In the poultry and other animal-production markets, including but not limited to chickens, turkeys, and the like, the ability to control or affect the sex of the animals would greatly enhance the production and efficiency of production. For example, in egg laying operations only hens or females are desired. Thus, when a flock of avian is born, only female avians are retained and often male avians are euthanized or otherwise disposed of. In broiler operations, males are desired because they grow faster and have improved feed conversion. Because males and females are born at an approximate 50/50 sex ratio, approximately half of all avian born at such operations, are thus lost, unproductive, under productive, or provide diminished production.

A need thus exists for controlling, promoting, or otherwise influencing the sex of the oviparous animals and avians before hatching in order to selectively produce more male or female oviparous animals and avians, and thereby increase production and decrease waste and costs. A need also exists for robust cost effective methods and fixtures that can achieve such results.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
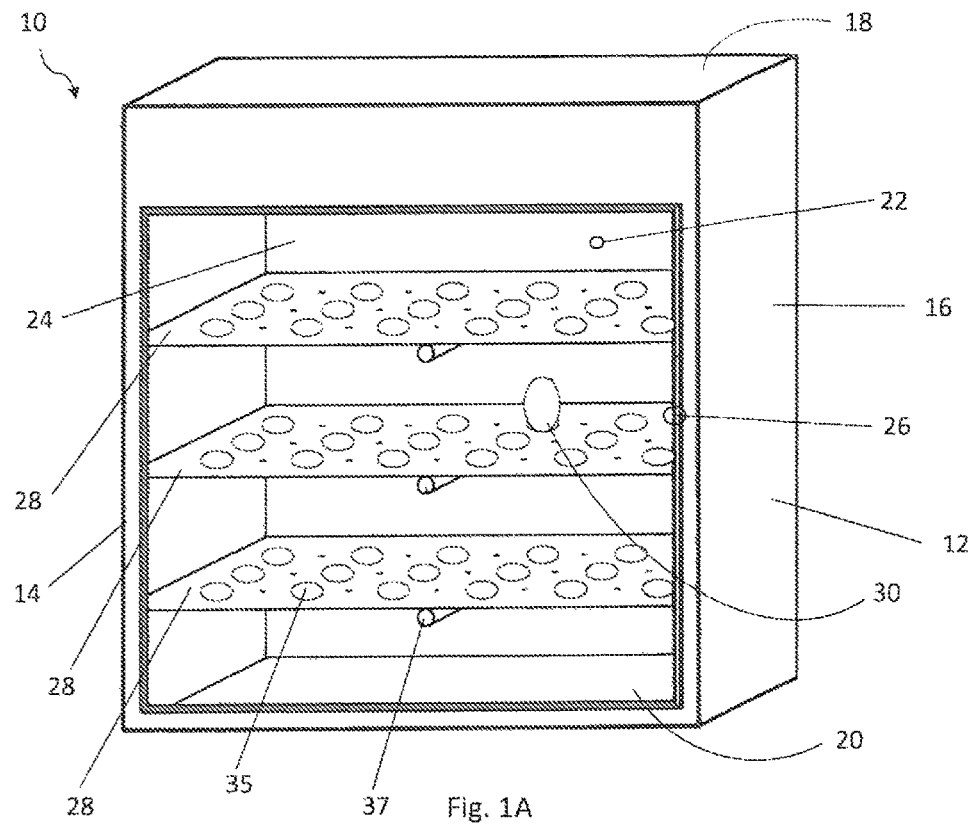
FIG. 1A is a perspective view of an incubation chamber.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to controlling or influencing the sex of embryos in eggs in order to promote the development of embryos of a selected sex. The systems and methods rely on the application of light having selected wavelengths to incubated eggs in order to influence the sex ratios of embryos in development within the eggs. The systems include an incubating device having an interior cavity in which lighting elements emitting light having the selected wavelengths are mounted. The lighting elements are mounted on trays designed to hold the eggs, such that light emitted by the lighting elements irradiates the eggs. The lighting elements illuminate the eggs during an early incubation period, and thereby promote the production of eggs of a selected sex.

Various studies have been performed on sex-determination in avians. In one study, the localization of P450 (17-alpha) and P450 aromatase (P450arom) mRNA expression was studied in the gonads of chicken embryos at days 4-9. The first detection of P450 (17-alpha) mRNA was at days 5-6 of incubation in the genetic male and female gonads, and the first detection of P450arom at day 6.5 in the female gonad with none in the male gonad. Thus sex determination in chickens appears not to occur until several days after incubation.

Further, estrogen synthesis plays a critical role in avian sex determination. The two terminal enzymes necessary for estrogen synthesis, P-450 aromatase and 17βHSD are expressed only in ZW (female) gonads at the onset of morphological differentiation (day 6-6.5). Aromatase and 17βHSD are therefore the key sexually dimorphic components.

In addition, enzyme synthesis is very sensitive to environmental stimuli. One known environmental stimuli is temperature, as observed in temperature-dependent sex determination (TSD). TSD is a type of environmental sex determination in which the temperatures experienced during embryonic development determine the sex of the offspring. It is most prevalent and common among amniote vertebrates that are classified under the reptile class. For that matter, studies have shown that increased incubation temperature in very specific H&H stages (a series of normal stages in the development of the chick embryo as provided by Hamburger V, Hamilton H L Dev. Dyn. 1992 December, 195(4): 231-272) changes the gender of poultry; however, such increase in temperature causes a decrease in hatchability to the point where such a gender change is not economically beneficial.

Additionally, research has shown that by using RNA interference to reduce DMRT1 (doublesex-mab-3-related transcription factor 1) protein expression leads to feminization of the embryonic gonads in genetically male embryos causing partial sex reversal. A similar phenomena is seen in turtles through TSD. In particular, DMRT1 expression in turtles has been shown to increase at temperatures at 26° C. resulting in an increase in male turtles, whereas at higher temperatures and particularly 32° C. DMRT1 expression was suppressed resulting in an increase in female turtles.

In chickens, DMRT1 has been seen expressed in the genital ridge and Wolffian ducts as early as stage 19, or 3.5 days into the chicken incubation period and is expressed through stage 32 into day 9 of incubation. This precedes the production of the anti-Mullerian hormone (AMH or Mullerian inhibiting substance-MIS) believed responsible for suppression of the creation of female organs and responsible for the formation of the testis that is shown to occur at stage 28 or 29 approximately 6.5 days into the incubation period. Therefore, by enhancing or suppressing DMRT1 sex-reversal is able to be accomplished.

Reference now is made in detail to the examples illustrated in the accompanying drawings and discussed below.

FIG. 1A show an incubating device 10 that has a body 12. In the illustrative embodiment of FIG. 1A, the body 12 has a generally rectangular cuboid shape having first and second sidewalls 14 and 16 parallel to each other. The first and second sidewalls 14 and 16 are connected to and orthogonal to top and bottom walls 18 and 20 that are themselves in parallel to each other. A back wall 22 defines a hollow interior cavity 24 of the body 12. A front wall or door 26 is hingedly connected to one of the sidewalls 14 and 16 to allow access to the interior cavity 24 of the body 12, while also enabling the interior cavity 24 to be isolated from the outside environment when the door 26 is closed. In some examples, the door 26 is made of a transparent material and/or includes a window to allow a user to view the interior cavity 24 while the door 26 is closed. In other examples, the door 26 completely encloses the interior cavity 24. The door 26 may further be formed of one-way window such that a user can view the interior cavity 24 from outside, while light from outside of the cavity 24 does not enter the cavity 24 through the window. The body 12 generally shields the inside of the incubating device 10 and eggs located in the incubating device 10 from radiation, including light, that is present outside of the incubating device 10.

A plurality of holding members or trays 28 are disposed within the interior cavity 24. The trays 28 are configured to receive and stably hold a plurality of eggs 30. As shown, each tray 28 can include a plurality of slots, holes 35, or other cups each configured to stably hold one egg. The trays 28 are mounted to the interior of the body 12. In some examples, the trays 28 are mounted on one or more actuators that enable the trays 28 to move with respect to the body 12. In one example, each tray 28 is mounted on a rotatable axle 37 mounted to and controlled by a rotational actuator 39 (see FIG. 1B). The actuator 39 is itself mounted to the body 12, and is operative to move the trays 28 with respect to the body 12. The actuator may continuously or periodically move the trays 28 having the eggs 30 disposed thereon. In the one example, the actuator 39 is operative to rotate the tray between a horizontal position (as shown) and angled positions in the clockwise and counter-clockwise directions. The angled positions may correspond to angles measured from the horizontal, and may range between 0° and a maximum angle (e.g., 15° or 30°). The maximum angle is generally selected such that even when the tray is rotated to the maximum angle, any eggs 30 disposed on the tray 28 are not dislodged from their slots, holes 35, or cups.

The eggs 30 can be of any avian species, including, but not limited to chicken eggs, turkey eggs, duck eggs, quail eggs, pheasant eggs, and the like. Reptilian and other species' eggs may also be used. The trays 28 rotate or tilt to various angles in response to actuators 39 to simulate the movement the egg would encounter in nature, for example as the egg is laid upon by a hen or subject to other environmental conditions.

Figure 1B:
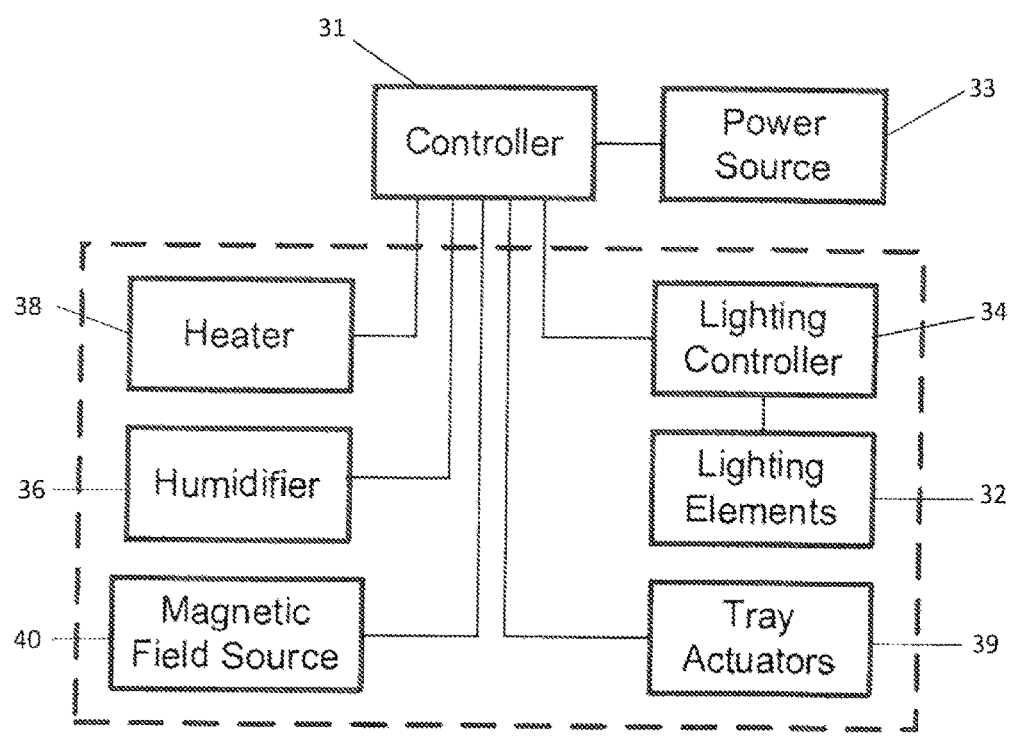
FIG. 1B is a schematic of the incubator control system.
Figure 1C:
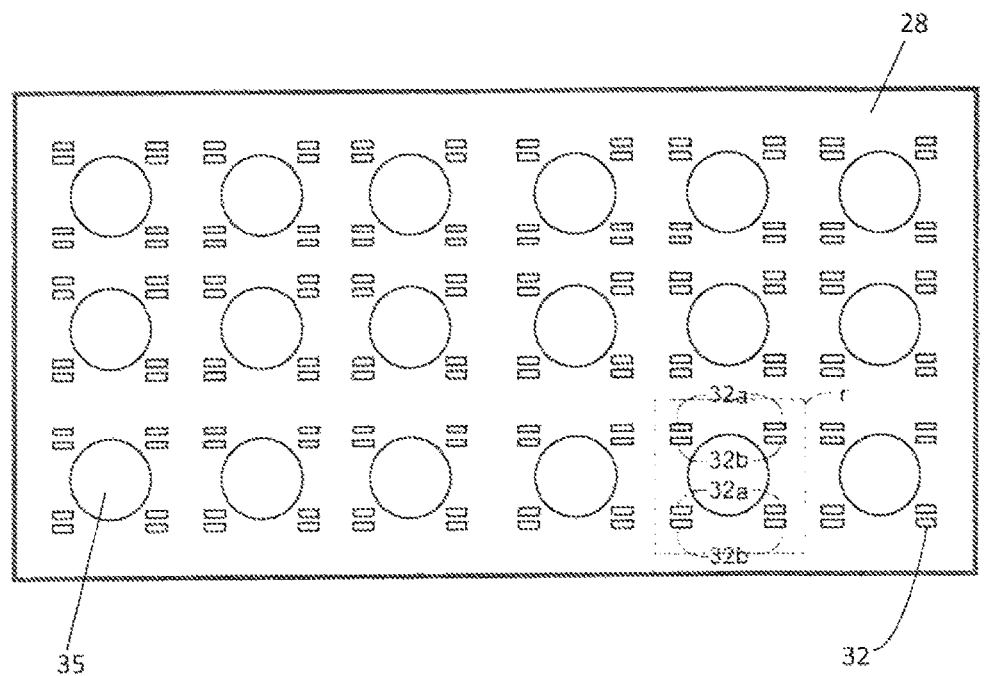
FIG. 1C is a perspective view of an incubator tray.
Figure 1D:
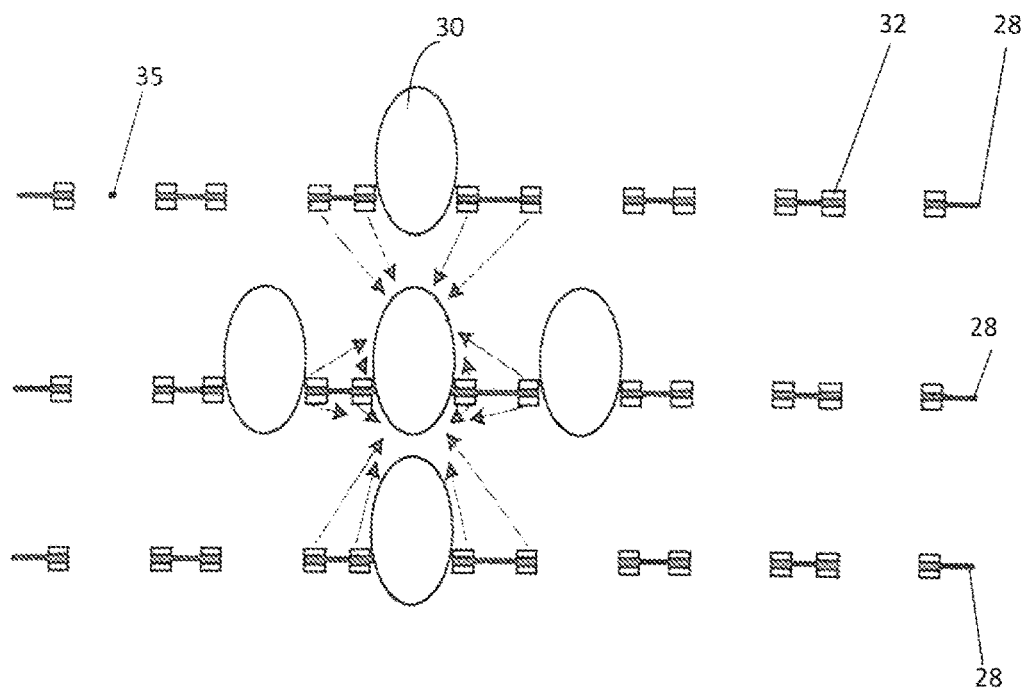
FIG. 1D is a side view of several incubator trays.

FIG. 1C provides a detailed top view of a tray 28, while FIG. 1D provides a cross-sectional view through multiple trays 28. Note that in some embodiments, the top and bottom views of a tray 28 are substantially identical, and in such embodiments a bottom view of a tray 28 may thus be substantially identical to the view shown in FIG. 1C.

As shown in FIGS. 1C and 1D, a plurality of lighting elements 32 are disposed on one or both surfaces of each tray 28. In one example, the lighting elements 32 are disposed only on an underside of each tray 28. In another example, the lighting elements 32 are disposed only on an upper surface of each tray 28 (corresponding to a surface on which the eggs 30 are disposed). In other examples, the lighting elements 32 are disposed on both the underside and the upper surface of each tray 28, as shown in FIG. 1D. Lighting elements 32 can additionally or alternatively be disposed on surfaces of the body 12 (e.g., surfaces of the interior cavity 24), or other locations from which light and/or radiation emitted by the lighting elements 32 reaches the eggs 30.

In general, the lighting elements 32 are disposed such that they can provide a high lighting intensity to each egg 30 disposed in the incubating device 10. The lighting elements 32 may thus be disposed in close proximity to the slots, holes 35, or cups holding the eggs 30, as shown in FIGS. 1C and 1D. Further, the lighting elements 32 are disposed such that light emitted by the elements 32 can reach all or substantially all surfaces of each egg 30. Hence, as shown in FIG. 1D, an egg 30 can receive light emitted by the elements 32 from all sides. The trays 28 and of the slits, holes 35, or cups for holding the eggs 30 can also be designed so as to enable substantially all surfaces of each egg 30 to receive light.

The lighting elements 32 are electrically connected to one another and to an electrical power source 33 (shown in FIG. 1B). In a preferred embodiment the plurality of lighting elements 32 are light emitting diode (LED) elements that receive an AC voltage and/or AC current waveform at their terminals for activation. In particular, the assembly formed of the lighting elements 32 and power source 33 can incorporate AC driven LED technology from any one of the following patent applications: U.S. Pat. Pub. No. 2011/0101383 to Grajcar; U.S. Pat. Pub. No. 2011/0109244 to Grajcar; U.S. Pat. Pub. No. 2011/0210678 to Grajcar; U.S. Pat. Pub. No. 2011/0228515 to Grajcar; U.S. Pat. Pub. No. 2011/0241559 to Grajcar; U.S. Pat. Pub. No. 2011/0273098 to Grajcar; U.S. patent application Ser. No. 13/452,332 to Grajcar; and/or U.S. Pat. Prov. Appl. No. 61/570,552 to Grajcar, which are all incorporated in their entirety herein.

The incubating device 10 can include various systems for controlling conditions within the interior cavity 24 of the device 10. FIG. 1B is a block diagram of some systems operative to control environmental and other conditions within the interior cavity 24. As shown in FIG. 1B, the incubating device 10 can thus include a heater 38 and/or cooler for controlling a temperature in the interior cavity 24, and/or a humidifier 36 and/or de-humidifier for controlling a level of moisture in the interior cavity 24. An optional magnetic field source 40 can further be used to apply a constant and/or time-varying magnetic field or flux within the interior cavity 24 in response to an excitation current applied to the source 40. In embodiments including a magnetic field source 40, the walls of the body 12 and/or the interior walls of the cavity 24 may provide magnetic shielding and provide a return path for the magnetic field or flux applied to the cavity 24. Tray actuators 39 may further be mounted to the trays 28 so as to be operative to continually or periodically move, rotate, or shake the trays 28. As noted previously, the incubating device further includes lighting elements 32 configured to emit light and/or other radiation for application to eggs 30 disposed in the interior cavity 24. Each of the systems receives power for operation from power source 33.

A controller 31 is operative to operate the systems operative to control environmental and other conditions within the interior cavity 24. The controller 31 can activate and de-activate each system, and can further regulate the operation of the systems to reach a pre-determined temperature, humidity, magnetic field or flux, or the like. The controller 31 may include or be electrically coupled to sensors (not shown) located in the interior cavity 24 and providing the controller 31 with information on current environmental conditions including temperature, humidity, and the like. In some embodiments, the controller 31 includes a clock and is operative to control the systems according to a pre-determined schedule. The controller 31 may thus operate the systems on a periodic basis (e.g., by repeating an activation pattern each day), or on another time-varying basis (e.g., by activating the systems according to different patterns on each day of incubation).

A lighting controller 34 is operative to control operation of the lighting elements 32. The lighting controller 34 can be separate from the controller 31 (as shown), or the lighting controller 34 can be integrated within the controller 31. The lighting controller 34 is operative to control the intensity and/or wavelength of light emitted by each lighting element 32. The lighting controller 34 can further activate and/or dim the lighting elements 32 on a continuous or on a time-varying basis (e.g., a periodic or an aperiodic basis), as described in further detail below.

The lighting controller 34 can operate the lighting elements 32 in unison, such that all lighting elements are synchronously activated and de-activated, and/or such that all lighting elements are activated with a same lighting intensity or dimming. Alternatively, the lighting controller 34 can operate different sets of lighting elements 32 differently, for example to cause a first set of lighting elements 32 to be activated for a particular period of time (and/or at a particular intensity level) and cause a second set of lighting elements 32 to be activated for a different period of time (and/or a different intensity level).

In some embodiments, the lighting controller 34 is operative to control a wavelength of light emitted by the lighting elements 32. In particular, the plurality of lighting elements 32 may include multiple sets of lighting elements 32 each operative to produce light having a different wavelength. For example, the plurality of lighting elements 32 can include a first set of lighting elements operative to produce light having a wavelength within a first range of wavelengths (e.g., 410-440 nm, 440-495 nm, the green wavelength light in the range of 535 to 570 nm, red wavelength light is in the range of 620 to 660 nm, or other narrow wavelength range), and a second set of lighting elements operative to produce light having a wavelength within a second range of wavelengths (e.g., 410-440 nm, 440-495 nm, 535-570 nm, 620-660 nm, or other narrow wavelength range) different from and non-overlapping with the first range. Note that a light source may be operative to produce light having a spectrum substantially concentrated within the specified range or narrow band of wavelength when over 90% or over 95% of the lighting energy emitted by the light source is within the specified narrow range of wavelengths. In some examples, the light source may thus also emit a small amount of light outside of the specified range. For LED's the specified band of wavelength, specific wavelength, or narrow band of wavelength may refer to the wavelength at which the LED emits maximum spectral power. Other lights and spectral outputs will work with the invention as long as there is sufficient light to obtain the desired purpose and no or minimal light that will have a deleterious effect. This narrow band of wavelengths includes wavelengths that are visible to humans and ultraviolet and infrared wavelengths not visible to humans, including but not limited narrow bands of wavelength in any range from 300 nm to 800 nm. The plurality of lighting elements 32 can further include additional sets of lighting elements operative to produce light having other wavelengths. The lighting controller 34 is operative to control each set of lighting elements 32 separately, and can hereby adjust the range of wavelengths of light that is emitted by the plurality of lighting elements 32 by selectively activating the different sets of lighting elements 32 at respective lighting intensities.

In general, the eggs disposed inside of the incubating device 10 are shielded from light and other radiation that is present outside of the incubating device 10. As a result of the shielding, including the shielding provided by the incubating device 10, the eggs 30 may therefore be only exposed (or substantially only exposed) to the range of wavelengths of light emitted by the lighting elements 32 in the incubating device 10 that are activated during the incubating period. Furthermore, the lighting controller 34 may be operative to ensure that no lighting elements 32 producing light with wavelengths substantially concentrated outside of the specified range are activated during the incubation period, or during the period in which the specified range of wavelengths are applied to the eggs.

For example, in region 'r' of tray 28 shown in FIG. 1C, two different sets of lighting elements 32 are provided: a first set of lighting elements 32a is operative to emit light within one range of wavelengths, while a second set of light elements 32b is operative to emit light within another range of wavelengths. The lighting controller 34 is operative to separately control the sets of lighting elements 32a and 32b such that each set can be activated at a different time and with a different intensity than other sets of lighting elements.

Different sets of lighting elements can similarly be provided on the rest of the tray 28 outside of region 'r', including on another surface of tray 28.

In one embodiment, the plurality of lighting element 32 includes lighting elements 32 emitting blue wavelength (440-495 nm) light, ultraviolet light, or electromagnetic radiation. The lighting elements 32 are controlled by lighting controller 34 that is operative to dim the intensity of the light so as to reduce the intensity to less than 3 lumens. Thus, a constant low intensity wavelength light is emitted throughout the interior cavity 24. The light can be of a narrow frequency or monochromatic to direct the exact wavelength of light desired. In addition, while described as low intensity, a higher intensity wavelength of light can be provided if needed by the controller 34. Further, in the embodiment where LED elements are utilized as lighting elements 32 because of the properties of LED lighting elements, the lights can be left on for long durations of time.

In the same or another embodiment, the plurality of lighting elements 32 includes lighting elements 32 emitting light have wavelengths ranging from 410-440 nm. The lighting elements 32 further are controlled by the lighting controller 34 that is operative to dim the intensity of the light so as to reduce the intensity to less than 3 lumens. Thus, a constant low intensity wavelength light is emitted through the interior cavity 24. In addition, while described as low intensity, a higher intensity wavelength of light can be provided if needed by the controller 34.

While the intensity of the light can be reduced to less than 3 lumens, the intensity of the light similarly can be increased to outputs of 800 lumens, 1000 lumens, or more. Similarly, while light duration can be for long periods of time such as days, weeks, or months, the duration between light and dark periods can also be controlled to a precision of hours, minutes, seconds, and even milliseconds by the lighting controller 34.

In other embodiments, the plurality of lighting elements 32 includes on a same tray 28 lighting elements emitting electromagnetic radiation and light in the ultraviolet/blue wavelength range, as well as lighting elements emitting light in the red wavelength range.

The humidifier 36 is also associated with the interior cavity 24 and is preferably attached to the top wall 18. The humidifier 36 has a tubing element that can increase the humidity level within the interior cavity 24 when the door 26 is closed. The humidifier 36 can include a water input port for receiving water. In this manner, the humidity within the interior cavity 24 can be controlled to provide any relative humidity from 0% humidity to 100% humidity, such that the humidity with the interior cavity 24 is pre-determined. Preferably the humidity is maintained within a range of 50%-80% humidity. In some examples, a dehumidifier can also be used to maintain humidity within the pre-determined range.

The heater 38 is also electrically connected to the power source 33, and is disposed within the interior cavity 24 to provide a predetermined amount of heat within the interior cavity. Preferably, the interior cavity 24 of the incubation device 10 is kept at a temperature of between 90 and 110 degrees Fahrenheit during incubation.

In one embodiment, the magnetic field source 40 is associated with the incubating device 10, and is mounted within the interior cavity 24 to form a pre-determined magnetic flux through or affecting eggs 30 disposed in the cavity 24.

While the incubating device 10 in the figures is shown as a closed cavity device, the incubating device 10 similarly can have an open interior cavity as seen in sealed commercial incubation chambers and commonly referred to as setters or hatchers without falling outside the scope of this disclosure. In particular in such a setting while the lighting elements can be placed on holding members such as tray elements or basket elements to irradiate eggs therein similar to described in this disclosure, a lighting structure or device containing lighting elements that irradiate eggs from outside the interior of the incubation device without falling outside the scope of this disclosure. The lighting elements can be on removable frames that fit onto or into the hatchers and setters of the invention.

Figure 2:
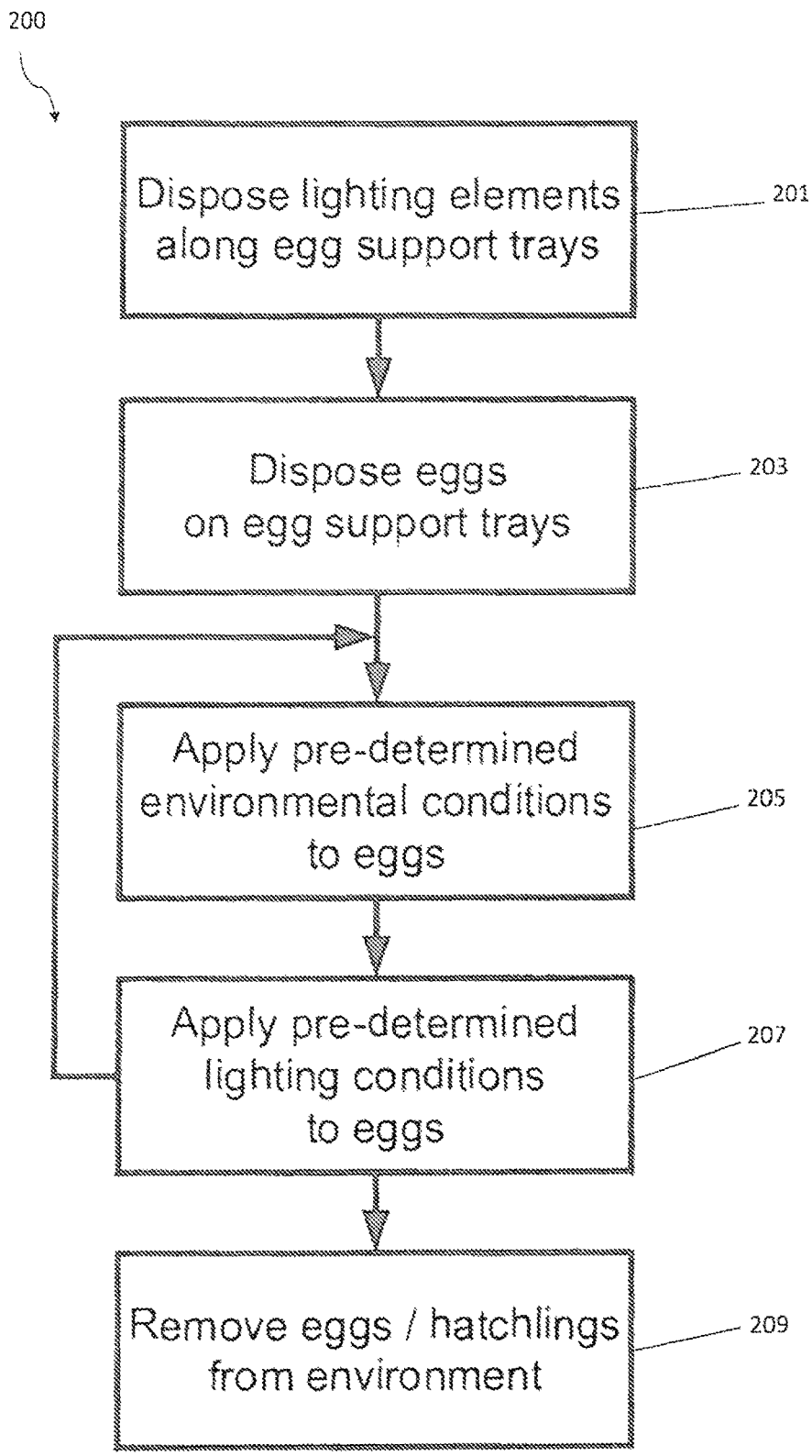
FIG. 2 is a process of one embodiment of the invention.

FIG. 2 is a flow diagram showing steps of a method 200 for controlling the sex of oviparous embryos using light sources. The method can be performed using an incubating device such as incubating device 10, or using any other appropriate device.

Method 200 begins with step 201 in which lighting elements (e.g., lighting elements 32, such as LEDs) are disposed along egg support trays. In embodiments in which incubating device 10 is used, the egg support trays are trays 28. Lighting elements may be mounted on the egg support trays as shown in FIGS. 1C and 1D, including on upper and/or lower surfaces of the egg support trays. Alternatively or additionally, lighting elements can be mounted on side surfaces of the interior cavity 24 so as to be disposed along the egg support trays and to illuminate upper and/or lower surfaces of the egg support trays. Lighting elements may emit light within a pre-determined wavelength range, and different sets of lighting elements emitting light in different wavelength ranges may be disposed along the support trays. The lighting elements may be on removable frames near or on the egg trays 28.

In step 203, eggs are disposed on the egg support trays alongside of which the lighting elements have been disposed. In embodiments in which incubating device 10 is used, the eggs 30 are disposed within slits, holes 35, or cups located on or in the trays 28 and configured to hold the eggs 30 in place. The eggs are disposed so as to be spaced apart and evenly distributed on the egg support trays to ensure that light emitted by the lighting elements can reach substantially the entire outer surface of each egg 30.

Once the eggs are in place on the support trays, pre-determined environmental conditions are applied to the eggs in step 205. The environmental conditions can include pre-determined levels of humidity and temperature. The environmental conditions can further induce application of a magnetic field. The environmental conditions can additionally include movement or actuation, for example provided by tray actuators 39 operative to rotate trays 28 on rotational axles 37. In general, the environmental conditions are applied according to a pre-determined multi-day schedule, such that different environmental conditions can be applied on different days and/or at different times during each day. The environmental conditions are generally selected to promote hatching of the plurality of eggs.

In addition to environmental conditions, pre-determined lighting conditions are applied to the eggs in step 207 during the application of the environmental conditions. The lighting conditions are selected to promote production of embryos of a selected sex in the eggs. The lighting conditions can include pre-determined wavelengths of light being provided to the eggs 30 by the lighting elements, and pre-determined lighting intensities being provided for each wavelength. The lighting conditions are generally applied according to a multi-day schedule, such that different lighting conditions can be applied on different days and/or at different times during each day in accordance with environmental conditions applied over the multi-day schedule. The lighting conditions can include irradiating the eggs 30 with light having a spectrum substantially concentrated within a specified range of wavelength.

Steps 205 and 207 may be repeatedly performed as adjustments to the environmental conditions and/or lighting conditions are determined and applied to the eggs 30. When the incubation period of the eggs disposed on the support trays has expired, the eggs 30 and/or hatchlings from the eggs 30 are removed from the environment in step 209.

In operation, the pre-determining lighting conditions applied to the eggs in step 207 can be selected to control the sex of embryos contained in the eggs 30. For example, when an increase in the percentage of female avian offspring, such as turkeys, is desired from a plurality of eggs 30 or embryos, the eggs or embryos are illuminated by a predetermined electromagnetic radiation, UV, or blue light. Further, a predetermined humidity and magnetic field are also provided within the incubation device 10. As a result, enzymatic activity in the eggs is controlled in a reversible manner.

Specifically, the "P450" of P450 aromatase was derived from its spectral absorption characteristics (Photonic 450 nm). If this molecule absorbs light it has to convert it to another form of energy. The absorbed energy is not used to power a chemical reaction, nor converted to radiation. Thus heat, or possibly electron low to high spin transition must be the byproduct. This causes it to denature or work less effectively converting potential male avian into female avian.

In another embodiment DMRT1 protein expression is reduced or suppressed to cause sex reversal. In particular DMRT1 has a zinc motif or zinc finger core which absorbs near UV light (e.g., light having a wavelength of approximately 430 nm, such as light having wavelengths in the 410 nm-430 nm range). In this manner the DMRT1 is absorbing energy and thus increasing in temperature while the temperature increase on the rest of the embryo has a negligible effect on hatchability or decreases hatchability by less than 5% compared to a control group of eggs not utilizing the lighting treatment. In this manner the DMRT1 protein activity is suppressed by the increase in temperature similar to that shown in turtles and previously on chicken resulting in more female embryos without decreasing the hatchability percentage of the eggs to a point where the commercial advantages of the sex diversion is negated by the decrease in hatchability percentage.

In using this method the eggs 30 are irradiated with near-UV light or blue light (e.g., light having a wavelength of approximately 430 nm, such as light having wavelengths substantially concentrated in the 410 nm-440 nm range) during the period of time the DMRT1 protein is expressed during the incubation period or from approximately from day 3.5 to day 9 of incubation. By increasing the temperature of the DMRT1 protein through use of the narrow range of wavelengths of light, negative effects of decreased hatchability previously observed are avoided. Meanwhile by increasing the temperature of the DMRT1 protein from days 3.5 to 9 or during the period of DMRT1 expression in the egg, the expression of the DMRT1 protein is suppressed during this entire period thus causing the development of female organs and suppressing and preventing the expression of MIS, the anti-Mullerian hormone and testosterone resulting in full sex reversal similar to that seen in turtles. This will result in an increased percentage of female embryos.

Applicants have also found that by raising the temperature of the incubation chamber by a minimum of 1 deg F. over the optimal temperature, a further increase in the percentage of female embryos can be achieved. In some embodiments the minimum temperature is 2 deg F. over the optimal temperature. In some embodiments, the minimum temperature is 3 or more deg F. over the optimal temperature. In some embodiments, this increased temperature is only applied during days 3.5 to 9 for chicken species in an effort to limit any resulting decrease in hatchability. To further limit the decrease in hatchability, and in some instances to increase hatchability, red light in the range of 620 to 660 nm may be used during days 9 to 21 of the incubation cycle for chicken species.

In addition to using a first light treatment to select sex of an egg 30 and a second light treatment to increase and promote hatching of the egg 30, a third light and additional light treatments can be provided to effect the growth of the embryo within the egg 30. For example, a light treatment providing a narrow band of green wavelengths can be provided in days 0-4 of incubation when the myostatin hormone is being expressed to increase muscle mass of the embryo and resulting avian after hatching. Thus a lighting device that provides different light treatments targeting different desired outcomes is presented such that the light device can be electrically connected to the controller to provide the light treatments at the desired predetermined intervals to enhance growth of the avian. Therefore sequential lighting is provided to promote sex, growth and hatchability of an embryo within an egg 30.

While utilizing a narrow band of wavelengths of light to increase DMRT1 temperature is one method to successfully cause sex reversal in avian, in another embodiment, the temperature of the egg in an incubation device or chamber is increased as a result of increasing the temperature of the chamber or interior cavity of the incubation device only during the period of DMRT1 expression in the egg and then reducing the temperature back to the previous incubation temperature after this period. By minimizing the time of the increase in temperature, again, negative effects previously observed regarding decrease in hatchability rate is minimized. In this manner, the increase in heat can be limited to a partial period of time or part of the period of time that DMRT1 is expressed, such as for example only, days 3.5 to 6 of incubation. While the creation of hermaphrodites utilizing such a method is expected, full sex reversal shall occur for many of the incubated eggs while increasing hatchability compared to increasing temperature over a longer period of time.

In addition, when pre-disposed male avian experience sex reversal, while they are morphologically fully functional as a female, including able to lay eggs and reproduce, chromosomally these avian are still male having a ZZ chromosome or are homogametic. As a result, after an incubation period wherein light, temperature or other stimulant resulting in sex reversal from a male avian to a fully functional female avian, in certain embodiments chromosomally the female still has ZZ chromosomes but morphologically will be female.

In other embodiments, when an increase in male embryos is desired, as for broiler operations, the fertilized eggs are exposed to light in the range of 440 to 490 nm. In some embodiments, the eggs are only exposed to this light for days 3.5 to 9 of the incubation cycle for chicken species. In some embodiments, an increase in male embryos can be found where the incubation chamber is set to a maximum temperature 1 deg. F. below the optimal temperature for the species. In some embodiments, this lower temperature is only used during days 3.5 to 9 of the incubation cycle for chicken species. In some embodiments, a maximum temperature of 2 deg. F. or of 3 deg. F. or of 5 or more deg. F. below the optimal temperature for the desired species is used.

In this instance, when pre-disposed female of the species experience sex reversal, while they are morphologically fully functional as male, including able to fertilize eggs in the reproduction cycle, chromosomally these avian are still female having a ZW chromosome or are heterogametic. As a result, after an incubation period wherein light, temperature or other stimulant resulting in sex reversal from a female avian to a fully functional male avian, in certain embodiments chromosomally the male has ZW chromosomes but morphologically will be a functional male.

Figure 3:
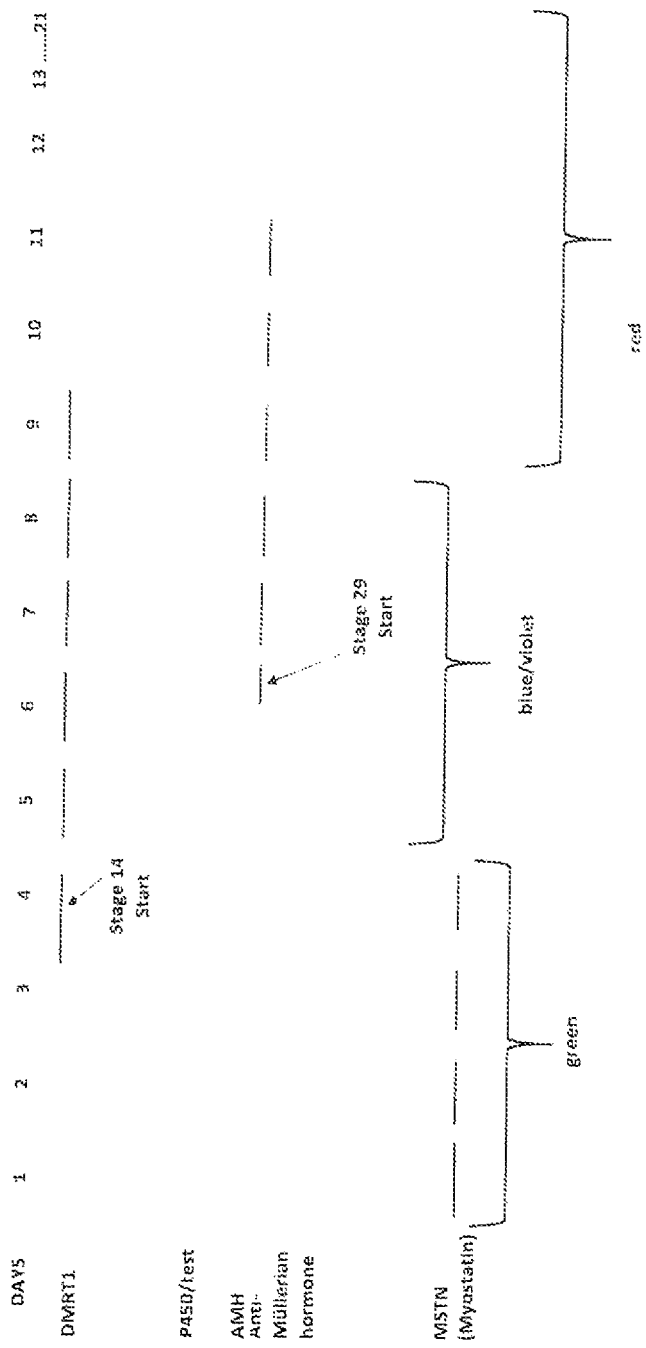
FIG. 3 shows the times during an incubation cycle when aspects of the invention are used.

Various embodiments of the Invention are represented in FIG. 3. While FIG. 3 is directed to chickens, the days for the treatments shown can be modified for other avian species as they progress through the same embryonic stages as chickens do. The days of the incubation cycle are shown on the top of FIG. 3. The various light and heat treatments of some embodiments are shown therein.

Figure 4A:
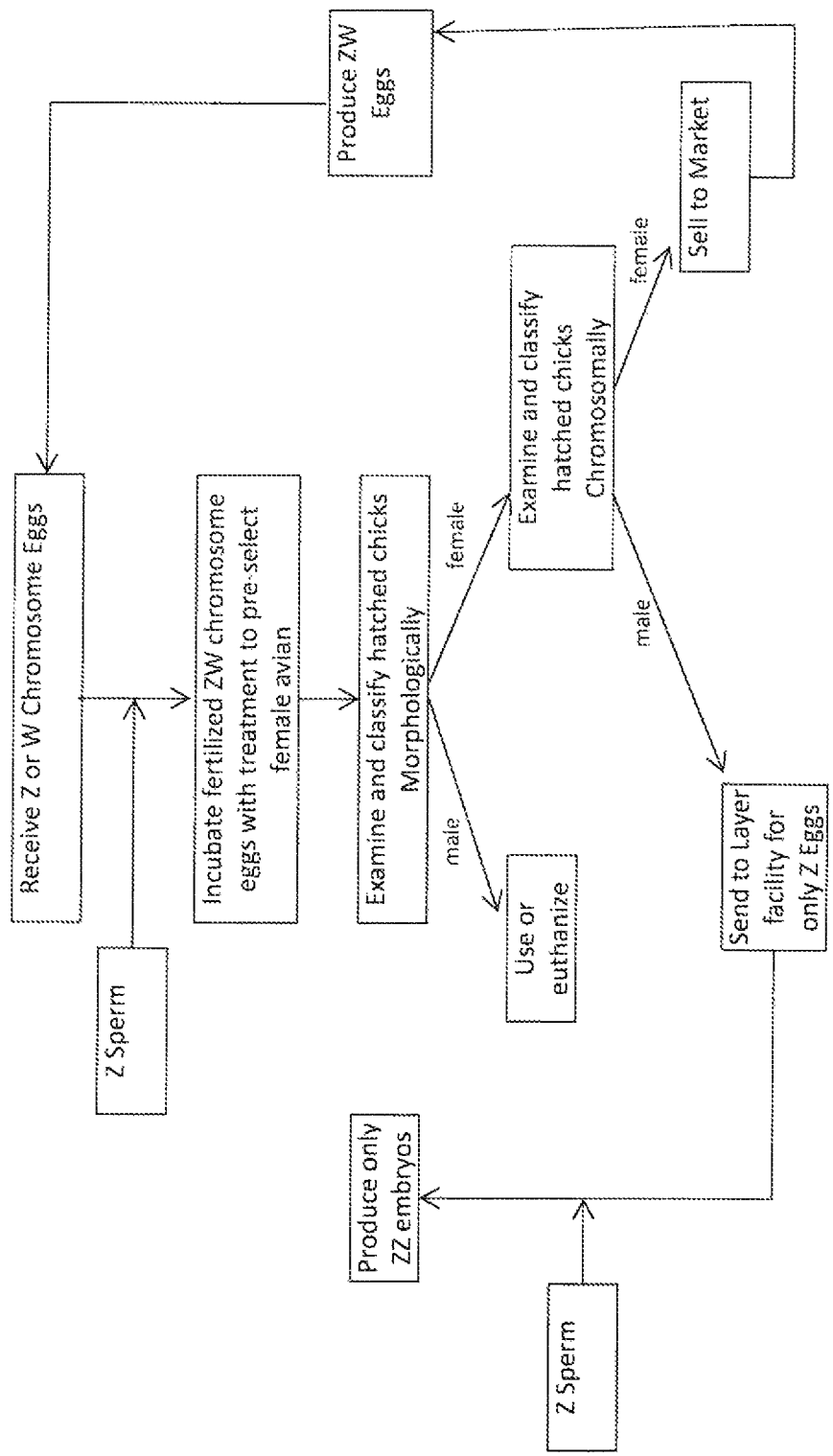
FIGS. 4A and 4B are diagrams of aspects of the invention.
Figure 4B:
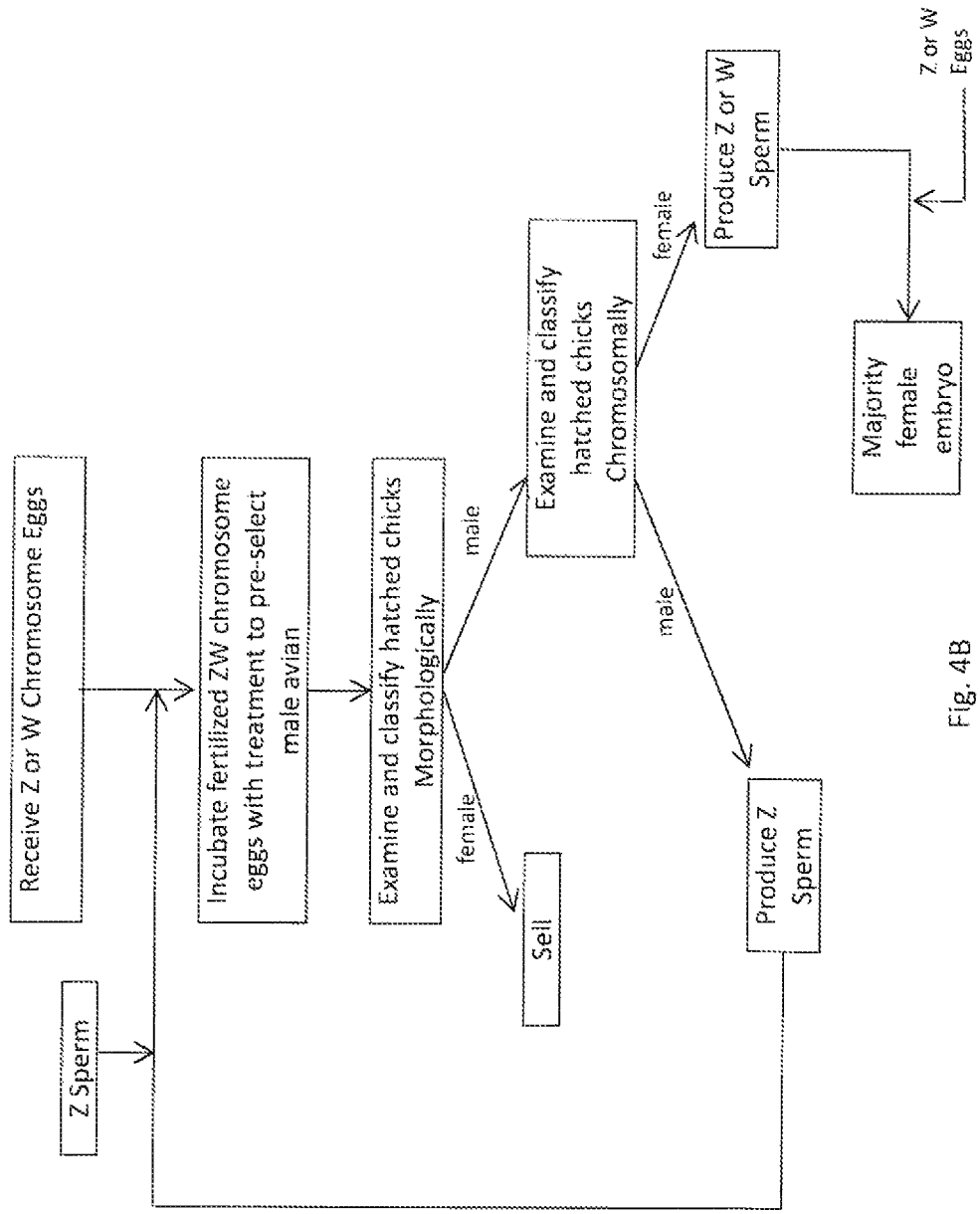

Thus, in operation, as best seen in FIG. 4A a first hatching facility is provided that receives a plurality of Z or W chromosome eggs and Z sperm, as is typical. During incubation of a group of such avian or other species eggs, the eggs receive a predetermined treatment to pre-select the sex of the avian to be morphologically female. The predetermined treatment can be of any type including a lighting treatment as described herein, a temperature treatment, combinations, or the like.

During a period after the group of avian hatches after such incubation, the group of avian are examined, classified and grouped morphologically. If the avian are male, they are euthanized. If the avian are female they are examined, classified and grouped chromosomally.

The avian that are morphologically and chromosomally female are selected and sent to a facility that raises and utilizes female avian. In one instance this includes a facility so that the female avian lays Z or W chromosome eggs that will undergo a predetermined treatment to pre-select the sex of the avian to be morphologically female.

The avian that are morphological female and chromosomal male are selected and sent to a facility raises avian that produce eggs that produce male avian. This selected group of morphologically female and chromosomally male avian then have their eggs fertilized as is known in the art. At this time the sperm from the male avian provides the male Z chromosome and the egg from the morphologically female and chromosomally male avian similarly provides a Z chromosome resulting in the hatching of a ZZ chromosome male. In this manner all eggs produced by the morphological female but chromosomal male result in male avian. Thus, by pre-selecting the morphological female and chromosomal male avian all incubated eggs hatched are male.

In another embodiment shown in 4B, normally fertilized eggs are incubated. During incubation of a group of such avian or other species eggs, the eggs receive a predetermined treatment to pre-select the sex of the avian to be morphologically male. The predetermined treatment can be of any type including a lighting treatment as described herein, a temperature treatment, combinations, or the like. During a period after the group of avian hatches after such incubation, the group of avian are examined, classified and grouped morphologically. If the avian are female, they sent to a facility where they can be used for egg laying or are raised as broilers. If the avian are male they are examined, classified and grouped chromosomally.

The avian that are morphologically and chromosomally male are selected and sent to a facility that raises and utilizes male avian. The avian that are morphological male and chromosomal female are selected and sent to a facility that raises avian that produce eggs that produce mainly female avian. This selected group of morphologically male and chromosomally female are used to fertilized typical Z or W eggs as they will have Z or W sperm. The fertilized eggs will be 25% male or ZZ, 50% female or ZW, and 25% will not be viable as they will have received a W egg and a W sperm. Thus, the resulting live chicks will be 67% female and 33% male. In this manner a majority of viable eggs produced by the morphological male but chromosomal female result in female avian. Thus, by pre-selecting the morphological male and chromosomal female avian a majority incubated eggs hatched are female.

By utilizing these technologies and methods the amount of avian that need to be euthanized are minimized. In addition this process greatly increases efficiencies and minimizes uncertainties.

In an experiment utilizing the near-UV light during the first days of incubation (e.g., during days 0-6 of incubation) sex reversal and a statistically significant number of hermaphrodites in the eggs that were treated resulted. Specifically, as a result of only delivering the light treatment during a partial period of DMRT1 protein expression, DMRT1 protein expression was only suppressed during the first several days of DMRT1 expression resulting in the beginning of female organ development within the eggs 30. When the light was eliminated at day 6 of incubation, DMRT1 production being no longer suppressed increased to a level seen in males for several of the eggs 30, resulting in the expression of the anti-Mullerian hormone and testosterone and the development of testes in addition to the already developing female organs. Hence an unusually large and statistically significant number of hermaphrodites resulted. Thus, by focusing the lighting treatment during days 3.5 to 9, DMRT1 protein expression is suppressed in the eggs 30 resulting from the eggs 30 being exposed to the near-UV light or the blue light. This results in fewer male offspring and more female offspring developing in the eggs.

In an alternative embodiment, during expression of DMRT1 protein or during days 3.5 to 9 of incubation the temperature in the incubating device or incubation chamber is reduced, thus enhancing DMRT1 protein expression. Consequently, similarly as seen in turtles the increased levels of DMRT1 results in anti-Mullerian hormone production along with testosterone to form testes and increase the number of male offspring compared to female. The temperature is then increased after day nine to a normal incubating temperature and a lighting treatment is provided to increase the hatchability of the eggs. In this manner sex diversion to result in more male offspring with limited effect on hatchability wherein hatchability is decreased less than 10% compared to eggs not undergoing the temperature decrease.

In an alternative embodiment, when during the period of time that the temperature in the incubating device or incubating chamber is reduced, preferably between days 3.5 and 9 when DMRT1 is being expressed, a light treatment is provided to promote hatchability by heating the embryo while avoiding heating of the DMRT1. In particular a narrow band of wavelengths of light that in one embodiment is red and preferably within 15 nm of 630 nm irradiates the eggs during this period. This is a wavelength that causes chemical reactions to occur within the mitochondria within the embryo and is efficiently absorbed by the copper and/or iron of the mitochondria to enhance growth within the embryo. Simultaneously, this light is minimally absorbed by the zinc within the DMRT1 having a minimal increase in temperature for the DMRT1 while having a significantly stronger effect on the embryo, working to increase hatchability of the embryo to offset the decrease of hatchability caused by the reduction in temperature to increase DMRT1 expression, thus causing sex reversal and increasing the amount of male avian to female avian compared to when no temperature or lighting treatment is provided.

In all, wavelength of light can be used to control the synthesis of P-450 Aromatase or reduce DMRT1 protein expression and improve hatchability and thus control or divert the sex of avian during the fertilization period so that either a larger percentage of female animals or a larger percentage of male animals result from incubation, as compared to a control group of a plurality of eggs that are not illuminated with the electromagnetic radiation, UV, or blue light. In one embodiment, an increase of at least 5% in the ratio of females to males is obtained relative to the ratio found in a control group in which illumination in the specified wavelength range is not applied. In another embodiment, the increase is of at least 10% in the ratio of females to males among the illuminated eggs relative to the ratio observed in control group eggs.

According to preferred protocols, the eggs or embryos are illuminated in step 207 with light having a selected wavelength range (e.g., 390-419 nm, 410-440 nm, 420-440 nm, 440-495 nm, or another appropriate range) at least for a period of one hour per day during the first six-and-a-half (6.5) days of incubation. In one embodiment, the embryos are illuminated for at least one hour per day using light having the selected wavelengths during the first, three-and-a-half (3.5) or four-and-a-half (4.5) days of the incubation period. Alternatively, the embryos are illuminated with light having the selected wavelength range for twenty-four (24) hours per day on days zero (0) through six-and-a-half (6.5) of incubation. Alternatively, other periods of illumination applied each day (or on another appropriate periodic basis) during the first six-and-a-half day period (6.5) of incubation is contemplated.

While different wavelengths of light can be used to increase the ratio of male-to-female or to increase the ratio of female-to-male avian embryos (as compared to control group ratios), similarly the intensity of light or lumen output applied to eggs can have an effect. Thus, depending on the avian species, whether turkey, chicken, duck, or the like, the exact wavelength and intensity (e.g., amount or number of lumens) can be determined to optimize the increase in the percentage of males or females born from a plurality of eggs when using lighting as compared to the percentage provided in a similar control situation (in which light of the selected wavelengths and intensity is not applied).

Similarly, the systems and methods described herein can be applied to eggs of other oviparous species, including fish, amphibians, reptiles, mammals, and the like. In one embodiment, lighting elements 32 are a plurality of underwater lighting apparatuses similar to those disclosed in U.S. patent application Ser. No. 13/715,904 to Grajcar et al. which is incorporated in full herein. The lighting elements 32 provide different wavelength of light to fish eggs located in their vicinity. The light is received by eggs of underwater life such as salmon, and is used to control the sex of the salmon or other species. In one embodiment, light having a blue wavelength of approximately 450 nm is applied to the eggs and causes an increase in the ratio of females to males as compared to a control group to which such wavelengths of light are not applied. Similarly, in another embodiment, light with wavelengths in the Soret band of visible absorption (from about 390 nm-419 nm) causes an increase in the ratio of males to females, as compared to a control group to which such wavelengths of light are not applied. Other wavelengths of light may similarly be utilized and emitted to optimize effects and to take into account the effect of the light traveling through water.

While many examples herein are for chicken species, this invention is equally applicable to avian species. Chickens have an incubation period of 21 days and a preferred or optimal incubation temperature of 99.5 deg. F. (37.5 Deg. C.). For turkeys, the incubation period totals 28 days and the preferred or optimal incubation temperature is 99.5-100° F. (37.5-38.1° C.). For ducks, incubation time varies between 28 and 35 days, depending on species, and the preferred incubation temperature is 99.5° F. (37.5° C.) during the setting period and then 99° F. (37.2° C.) during the hatching period. For quail, incubation time is 17 to 18 days, depending on species, and the preferred incubation temperature is 99.5° F. (37.5° C.) during the setting period and then 99° F. (37.2° C.) during the hatching period. For all avian species, the setting time is from 0 to three days before hatching and the hatching time is the last three days of the incubation period.

In some embodiments the LED's emit light with a wavelength between 360 nm and 400 nm, 400 nm to 450 nm, 450 to 500 nm, 550 nm-570 nm and/or 630 nm to 680 nm. In some embodiments, the LED's emit UVA, blue, green, or red light. In some embodiments, a white light is used either alone or with other colors. If a white light LED is used, it is an LED with a spectral curve wherein the ratio of the area under the curve of the blue peak to the area under the curve of the phosphor peak is between 0.5 and 1.5. In some embodiments, multiple wavelength bands are used together. Note that a light source may be operative to produce light having a spectrum substantially concentrated within the specified range or narrow band of wavelength when over 90% or over 95% of the lighting energy emitted by the light source is within the specified narrow range of wavelengths. In some examples, the light source may thus also emit a small amount of light outside of the specified range. In some embodiments, for LED's the specified band of wavelength, specific wavelength, or narrow band of wavelength may refer to the wavelength at which the LED emits maximum spectral power. Other light wavelengths and spectral outputs will work with the invention as long as there is sufficient light to obtain the desired purpose and no or minimal light that will have a deleterious effect. This narrow band of wavelengths includes wavelengths that are visible to humans and ultraviolet and infrared wavelengths not visible to humans, including but not limited narrow bands of wavelength in any range from 300 nm to 800 nm.

To promote hatchability, improve chick quality, and reduce stress early in chick life, either white or red light or white and red together is applied in a circadian manner (having a light and dark period with a 24-hr rhythm). The light period should be between 8-16 hours per day with the remaining hours dark. Irradiance should be between 100 and 500 lux. The red light may be between 630 and 670 nm. White light can be a typical warm or cool phosphor-based LED, where a 450 nm monochromatic blue LED is used to activate a green+red phosphor. Although benefits can be seen by applying this, light to final week of incubation, the strongest benefits may be obtained by incubating throughout the entire incubation for avian species.

To promote myogenesis and faster development, green light in the range of 495 nm to 570 nm, or in the range of 550 nm to 570 nm, or more preferably from 540 nm to 560 nm, can be applied. Applicants have found that light energy in the range of 0.2 W/m2 and 10 W/m2 or in the range or 300-600 mW/m2 (both on the surface of the egg) is desirable to effect myogenesis. In this case, applying green light has the greatest effect during critical myogenesis events in ovo. Likely the strongest effects may be achieved by applying the green light throughout the entire incubation period. In some embodiments, it is applied with circadian control.

Thus provided is a method and apparatus of accomplishing the same for controlling the sex of embryos including avian embryos. In particular, through the use of lighting assemblies that preferably are AC driven LED lighting assemblies, different wavelength and intensity light is provided to a plurality of avian embryos. Other influencers can include the exposure of the eggs to predetermined humidity and magnetic properties. As a result, the percentage of either males or females from the plurality of embryos is increased at least 5% as compared to embryos not receiving such wavelength and intensity of light.

Thus, for egg laying operations, the ratio of female animals obtained from a plurality of eggs can be increased, maximizing the amount of egg layers obtained from the plurality of eggs. This thereby decreases the number of avians that must be euthanized or lost, increasing efficiencies and maximizing profits.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The invention claimed is:

1. A method of promoting production of embryos of a selected sex in eggs, the method comprising:
   incubating a plurality of fertilized eggs in an incubation chamber to promote hatching of the eggs;
   selecting light having a spectrum substantially concentrated within a narrow range of wavelengths based on a selected sex of embryos being promoted in the eggs, wherein the narrow range is selected to be the 410-440 nm wavelength when production of female embryos is promoted, and wherein the narrow range is selected to be the 440-495 nm wavelength range when production of male embryos is promoted;
   irradiating the plurality of fertilized eggs with the selected spectrum of light while the plurality of fertilized eggs are incubated;
   selecting a temperature of the incubation chamber to a temperature at least one degree Fahrenheit above or below the optimal incubation temperature for the egg species, wherein the temperature of the incubation chamber is raised at least one degree Fahrenheit above the optimal incubation temperature when production of female embryos is promoted, and wherein the temperature of the incubation chamber is lowered at least one degree Fahrenheit below the optimal incubation temperature when production of male embryos is promoted; and
   controlling the temperature of the incubation chamber to the selected temperature while the plurality of fertilized eggs are incubated.

2. The method of claim 1 wherein the light having a spectrum substantially concentrated within a narrow range is only emitted during days 3 to 9 of the incubation cycle for chicken species.

3. The method of claim 1 further comprising:
irradiating the plurality of fertilized eggs with light having a second spectrum substantially concentrated within a narrow range of wavelengths while the plurality of fertilized eggs are incubated.

4. The method of claim 3 wherein the light having a second spectrum substantially concentrated within a narrow range of wavelengths is red light.

5. The method of claim 4 wherein the incubating eggs are irradiated with red light during days 9 to 21 of the incubation cycle for chicken species.

6. The method of claim 5 wherein the incubating eggs are irradiated with green light during days 0 to 4 for chicken species.

7. The method of claim 3 wherein the light having a second spectrum substantially concentrated within a narrow range of wavelengths is green light.

8. The method of claim 1 wherein the non-optimal incubation temperature is only provided during days 4 to 9 for chicken species.

\* \* \* \* \*